United States Patent
Lakhanpal et al.

(10) Patent No.: US 6,581,111 B1
(45) Date of Patent: Jun. 17, 2003

(54) OUT-OF-ORDER PROBING IN AN IN-ORDER SYSTEM

(75) Inventors: Sanjiv K. Lakhanpal, Austin, TX (US); Jennifer Pencis, Austin, TX (US); Chandrakant Pandya, Austin, TX (US); Mark D. Nicol, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 461 days.

(21) Appl. No.: 09/586,573

(22) Filed: Jun. 2, 2000

(51) Int. Cl.[7] ................................................ G06F 3/00
(52) U.S. Cl. ............................ 710/5; 710/54; 710/112; 711/1; 711/100
(58) Field of Search ........................... 710/1, 5, 3, 7, 710/20, 52–57, 112, 31, 54; 711/100, 118, 126, 141, 1

(56) References Cited

U.S. PATENT DOCUMENTS

| | | | | |
|---|---|---|---|---|
| 5,544,051 A | * | 8/1996 | Senn et al. ............ | 364/419.19 |
| 5,931,920 A | * | 8/1999 | Ghaffari et al. ................ | 710/5 |
| 6,088,740 A | * | 7/2000 | Ghaffari et al. ................ | 710/5 |
| 6,112,265 A | * | 8/2000 | Harriman et al. ............. | 710/40 |
| 6,275,905 B1 | * | 8/2001 | Keller et al. ................. | 711/141 |
| 6,370,621 B1 | * | 4/2002 | Keller ......................... | 711/141 |
| 6,393,529 B1 | * | 5/2002 | Keller ......................... | 711/141 |

OTHER PUBLICATIONS

AMD Athlon™ Processor Technical Brief, Publication No. 22054, Dec. 1999, pp. 1–7.
AMD Athlon™ Processor Data Sheet, Publication No. 21016–D, Aug., 1999, pp. 1–58.

* cited by examiner

*Primary Examiner*—Jeffrey Gaffin
*Assistant Examiner*—Rijue Mai
(74) *Attorney, Agent, or Firm*—Zagorin, O'Brien & Graham, LLP

(57) ABSTRACT

A command filter selectively forwards received commands to a command queue for in-order execution. If the received command is a probe response command or if probe response information is extracted from other commands, the probe response is stored in a storage location other than the command queue and executed out-of-order. Data movements specified by memory modifying commands already in the command queue and affecting the cache line in question are also performed out-of-order and the memory modifying command is discarded when it is removed in-order from the command queue.

24 Claims, 4 Drawing Sheets

| BIT-TIME | BIT NUMBER | | | | | | | | | | | | |
|---|---|---|---|---|---|---|---|---|---|---|---|---|---|
| | 14 | 13 | 12 | 11 | 10 | 9 | 8 | 7 | 6 | 5 | 4 | 3 | 2 |
| 0 | M1 | COMMAND[4:0] | | | | | PA[34:28] | | | | | | |
| 1 | PA[27:22] | | | | | | PA[12:6] | | | | | | |
| 2 | M2 | MASK[7:0] | | | | | | | CH | ID[2:0] | | | |
| 3 | RV | PA[21:13] | | | | | | | | PA[5:3] | | | |

FIG. 3A

| BIT-TIME | BIT NUMBER | | | | | | | | | | | | |
|---|---|---|---|---|---|---|---|---|---|---|---|---|---|
| | 14 | 13 | 12 | 11 | 10 | 9 | 8 | 7 | 6 | 5 | 4 | 3 | 2 |
| 0 | 0 | 00001 | | | | | STATUS[1:0] | | DM | VS | VDB[2:0] | | |
| 1 | 0 | | | | | | | | | MS | MAB[2:0] | | |
| 2 | 0 | X | | | | | | | | | | | |
| 3 | X | | | | | | | | | | | | |

FIG. 3B

OUT-OF-ORDER PROBING IN AN IN-ORDER SYSTEM

RELATED APPLICATIONS

This application is related to the following applications filed the same day as the present application, which applications are incorporated herein by reference in their entirety:

Application Ser. No. 09/586,575, entitled "FIFO with Undo-Push Capability", naming Jennifer Pencis, Chandrakant Pandya, Sanjiv K. Lakhanpal and Mark D. Nicol as inventors; and Application Ser. No. 09/586,574, entitled "Command Receive Filter", naming Jennifer Pencis, Chandrakant Pandya, Sanjiv K. Lakhanpal and Mark D. Nicol as inventors.

BACKGROUND OF THE INVENTION

1. Field of the Invention

This application relates to maintaining cache coherency in a computer system and more particularly to utilization of probe responses.

2. Description of the Related Art

In current processor implementations, a processor issues requests to a memory controller for such transactions as, e.g., read or write commands, or probe responses. In one implementation for a stand-alone processor, a command channel is provided over which the processor issues requests to another integrated circuit incorporating the memory controller. In such systems, data may be transmitted to and from the processor over a data channel that is separate from the command channel. In a typical computer system incorporating such a processor, an integrated circuit interfaces to the processor to provide both a memory control function and a bridge function between the host bus (the command and data channel) and other system buses. One of the bridge functions typically provided is a bridge between the host bus and a Peripheral Component Interconnect (PCI) bus. Such integrated circuits have been described in the art as "north bridges".

One of the functions performed by memory controller logic on a north bridge is to probe the cache memory located on the processor in order to maintain coherence between the various memory components when another device, e.g., an I/O device on the PCI bus, accesses memory. The probe determines whether the cache memory on the processor has a copy of the memory location (typically a cache line containing that memory location) about to be accessed by the I/O device. The processor responds through the command channel with a probe response indicating whether or not that particular cache line is located in the cache memory and its status.

In general, system requests from the processor can be handled in-order by a north bridge with, e.g., a single request FIFO buffer that stores the received requests and issues the requests in the order received. That applies even to systems that handle speculatively pipelined requests. The in-order approach allows designers to implement a simple and inexpensive design. However, when another bus master, e.g., another integrated circuit on an input/output bus such as the Peripheral Component Interconnect (PCI) bus, accesses system memory resulting in probe traffic to the processor, such probe traffic requires immediate attention to avoid a system deadlock or stall condition.

That deadlock situation can occur when, for example, a PCI input/output (I/O) command cycle targeted at a device on the PCI bus (e.g. a south bridge integrated circuit providing interfaces to other I/O devices and legacy functions) is at the top of the request FIFO (also referred to as the command queue) and the south bridge is granted the PCI bus for a bus mastering cycle to main memory for a direct memory access (DMA) transfer. Many PCI bus masters, once they start a master cycle cannot be interrupted until the cycle completes, even if backed-off the bus. So, if a probe response is handled in-order like all other commands, the north bridge can lock because the I/O cycle at the top of the command queue will never complete because the south bridge cannot handle the I/O cycle until its DMA cycle completes. But its DMA cycle cannot complete until the probe response is processed. If the probe response is stuck in the command queue behind the PCI I/O command, the deadlock situation has occurred.

Thus, probe traffic requires attention at a higher priority than other types of traffic. One way to provide a higher priority for probe traffic is to provide the capability for out-of-order processing for all requests. However, that approach can be very complex resulting in additional logic as well as additional design and validation time.

It would be desirable to solve the need for out-of-order processing of probe responses to avoid deadlock situations while maintaining the benefits of the simplicity of in-order execution.

SUMMARY OF THE INVENTION

Accordingly, a combination in-order and out-of-order implementation is utilized that provides the simplicity of in-order design but also the capability of executing probe responses ahead of normal commands.

In one embodiment, the invention provides a method of processing commands that includes receiving commands into an integrated circuit and determining when one of the received commands is a probe response. If it is, the probe response is stored in a location other than a command queue. Others types of processor-to-system commands are stored into the command queue, which is implemented for simplicity as a first-in, first out (FIFO) structure. Thus, the commands in the command queue are removed from the command queue for processing in-order. A probe response, on the other hand, is processed out-of-order ahead of commands previously received and stored in the command queue. Data movements associated with a memory modifying command awaiting execution in the command queue affecting the cache line that is subject of the probe response are also handled out-of-order. The memory modifying command is discarded when it is removed in-order from the command queue.

In another embodiment the invention provides an integrated circuit that includes a plurality of receive elements coupled to receive processor requests, including command information. A command filter circuit, coupled to the receive elements, is responsive to the command information to selectively forward the received requests. A command queue is coupled to the command filter circuit to store the forwarded received requests. The command queue is unloaded for processing in a command interpreter in a first in first out (FIFO) order. The command filter is responsive to a received probe response to forward the probe response to a storage location other than the command queue. The received probe response is processed by the command interpreter ahead of requests previously stored in the command queue.

BRIEF DESCRIPTION OF THE DRAWINGS

The present invention may be better understood, and its numerous objects, features, and advantages made apparent to those skilled in the art by referencing the accompanying drawings in which the use of the same reference symbols in different drawings indicates similar or identical items.

FIGS. 3A and 3B are exemplary packets for non-probe response commands and probe response commands, respectively.

DESCRIPTION OF THE PREFERRED EMBODIMENT(S)

Figure 1:
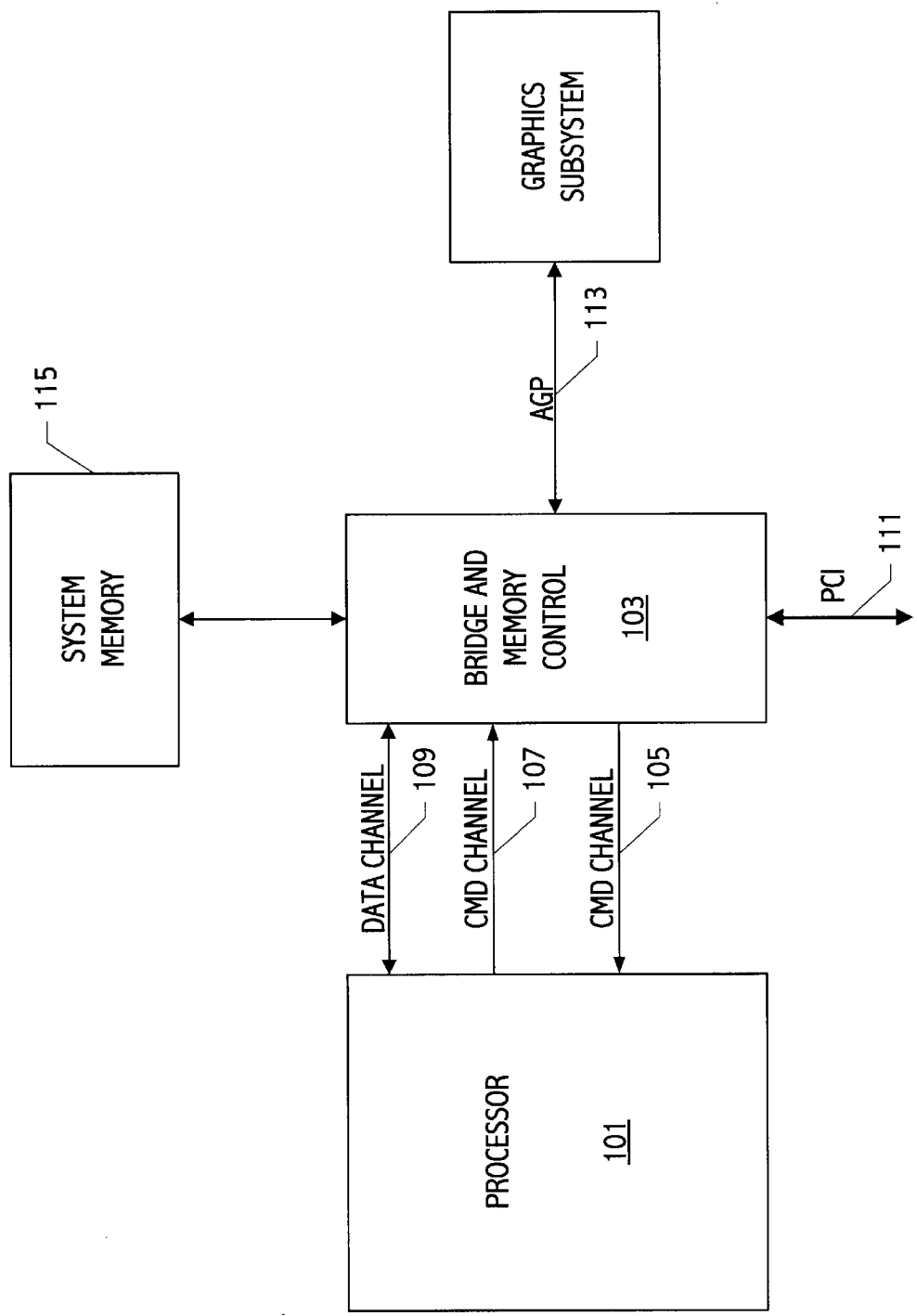
FIG. 1 is a block diagram of a system in which a processor is coupled to a north bridge by a command and data channel.

Referring to FIG. 1, the block diagram illustrates a computer system suitable for incorporating an embodiment of the invention. Processor 101 is coupled to bridge and memory control circuit 103 (which in some embodiments may be a north bridge) through unidirectional command channels 105 and 107 as well as a bi-directional data channel 109. The other control signals and information signals between the north bridge 103 and processor 101 are not shown to simplify the diagram. North bridge 103 provides a bridge function between the host bus (including the command and data channels) and the PCI bus 111 and Accelerated Graphics Port (AGP) 113. In addition, north bridge 103 provides a memory control function for system memory 115.

Figure 2:
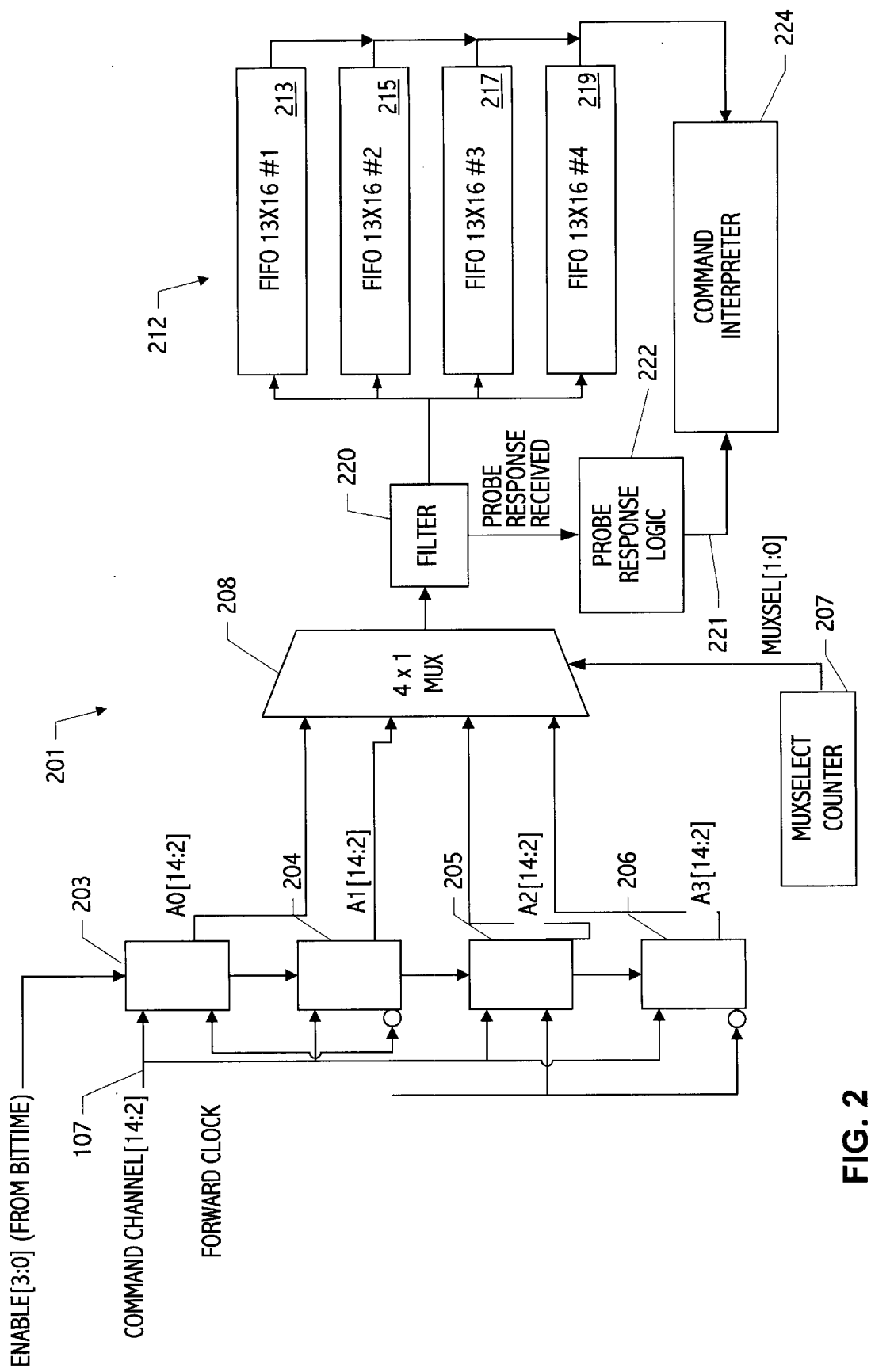
FIG. 2 illustrates a circuit that receives processor requests according to an embodiment of the present invention.

Referring to FIG. 2, north bridge 103 includes a receive circuit 201 coupled to receive commands from processor command channel 107. In one embodiment, the processor bus is a split transaction bus utilizing clock forwarding technology. Clock forwarding refers to supplying a clock with the data on the command channel. In the illustrated embodiment, data is forwarded on each edge of the clock. Thus, each edge of the clock is a bit time. An exemplary bus of that type is the processor bus utilized by Digital Equipment Corporation's Alpha™ EV6 or by Advanced Micro Devices Athlon™ processor. The receive circuit translates the incoming signals to the local time domain. In addition, the receive circuit includes a receive filter to remove unused commands as described further herein.

While the command channel is in idle state no operations (NOPs) are present in the channel. In one embodiment, the command channel data, which typically includes command and address information, is transferred in four bit times, i.e., four clock edges. The command channel information may include, e.g., a bit field defining the command as a read command and bit fields defining the start address and length of the read operation. The first portion of a command (non NOP) is transferred in bit time 0. The bit time is counted in a bit time counter (not shown) that tracks the current bit time. In the illustrated embodiment, the bit time counter counts from 0 to 3. As seen in FIG. 2, data from command channel 107 is clocked into one of four sets of buffers, 203–206. In one embodiment, the buffers are formed of positive edge and negative edge flip-flops to account for the fact that data is forwarded on the command channel on each clock edge. Each set of buffers in the embodiment illustrated includes 13 flip-flops so each buffer can store thirteen bits of command channel information. The command and address information from the first bit time is stored in buffer 203, the second bit time in buffer 204, the third bit time in buffer 205 and the fourth bit time in buffer 206. The enable bits [3:0] selectively enable the buffers 203–206 according to the bit time determined by the bit time counter.

A multiplexer select counter 207 provides multiplexer selects that are used to unload the command information from the receive buffers through multiplexer 208. The multiplexer select can be set to one of four values, and determines the sequence for unloading the buffers, thus accounting for differences in time domains between the command channel and the receive circuit. Once the buffers are unloaded, the command information can be assembled into the 52 bit command information in a command storage queue 212 utilized in the illustrated embodiment.

First in first out (FIFO) buffers 213, 215, 217, and 219 provide a command storage queue 212 for a command interpreter 224. The command storage queue includes four sixteen deep 13 bit FIFOs which can assemble sixteen 52 bits commands. However, as previously mentioned, not all of the commands received on command channel 107 require a response from north bridge 103. Accordingly, a command filter 220 is included to filter out those commands which do not require a response. Those commands not requiring a response are identified in filter 220, either as hard coded values for comparison or programmable values to provide greater flexibility. The command information received from command channel 207 is compared to the predetermined commands that do not require a response. Filter 203 may be implemented as series of comparators to compare, e.g., a five bit command field in the command information to the predetermined group of commands that are not forwarded to the command queue. If the received command is not in the predetermined group of commands, then the command is forwarded to command storage queue 212. However, if the received command is one of the predetermined commands, then the received command is dropped. That way, the command interpreter does not have to deal with those commands that do not require a response.

In one embodiment the commands that do not require a response from the north bridge include NOP (used for idle cycles on the command channel), a NZNOP (non-zero NOP indicating there is probe hit/miss information to be sent to the system), a victim data buffer flush (VDBFlush) (related to maintaining cache coherency for cache lines evicted from the cache memory), and probe responses. Those commands are filtered out at filter 220. However, the probe response command is not simply dropped as are the other commands not requiring a response from north bridge 103, as described further herein.

Exemplary command packets are shown in FIGS. 3A and 3B. The illustrated command packets take four bit times to transfer with the five bit command field being transferred in bit time 0. NOP commands occupy two bit times rather than four and thus can start in bit time 0 or 2. The PA fields provide the physical address bits corresponding to the command. The mask field MASK[7:0] is used for sub-cache block commands (byte, longword, or quadword) and indicates which bytes, longwords, or quadwords on data channel 109 are valid for the requested data transfer. The M1, M2 and CH bits relate to probe responses and their use is described further herein. The ID[2:0] field specifies a buffer entry corresponding to the command in CMD[4:0]. The command packet illustrated in FIG. 3B is used for certain types of probe responses. As previously mentioned, the probe response commands are not simply dropped as are the other commands not requiring a response from north bridge 103.

There can be several types of probe responses. Probe responses may occur without data movement indicating a cache line hit or miss that does not require data movement. Those probe responses can be embedded in other commands using the M1, M2 and CH bits. Probe responses may also occur with data movement, e.g., when the cache line is "dirty", meaning it has been modified and differs from the copy of the cache line in system memory. If a cache line is dirty, it needs to be written back into system memory. Finally, probe responses may be received indicating that there is a command in-flight affecting the cache line that is the subject of the probe response. That means that the probe response has hit in, e.g., the victim data buffer.

A probe response not requiring data movement may be included in the command packet illustrated in FIG. 3A. Several bits (M1, M2, CH) are used to encode the probe status of the oldest outstanding probe issued by the system to the processor. In one embodiment, those bits are encoded as shown in Table 1:

TABLE 1

| M1 | M2 | CH | Description |
| --- | --- | --- | --- |
| 0 | 0 | 0 | No probe response |
| 0 | 0 | 1 | Invalid |
| 0 | 1 | 0 | Cache miss on oldest outstanding probe (bit-time 2) |
| 0 | 1 | 1 | Cache hit on oldest outstanding probe (bit-time 2) |
| 1 | 0 | 0 | Cache miss on oldest outstanding probe (bit-time 0) |
| 1 | 0 | 1 | Invalid |
| 1 | 1 | 0 | Invalid |
| 1 | 1 | 1 | Invalid |

Those bits are checked by the command filter and the information forwarded so the probe response can be disposed of by the system out-of-order with respect to commands in the command queue. The command itself containing the encoded probe status is entered into the command queue for normal in-order processing. When the command is processed, those bits relevant to the probe response can be ignored. A probe response requiring data movement or a probe response that hits in the victim data buffer (VDB) is provided in the separate command packet dedicated to probe responses shown in FIG. 3B.

Figure 4:
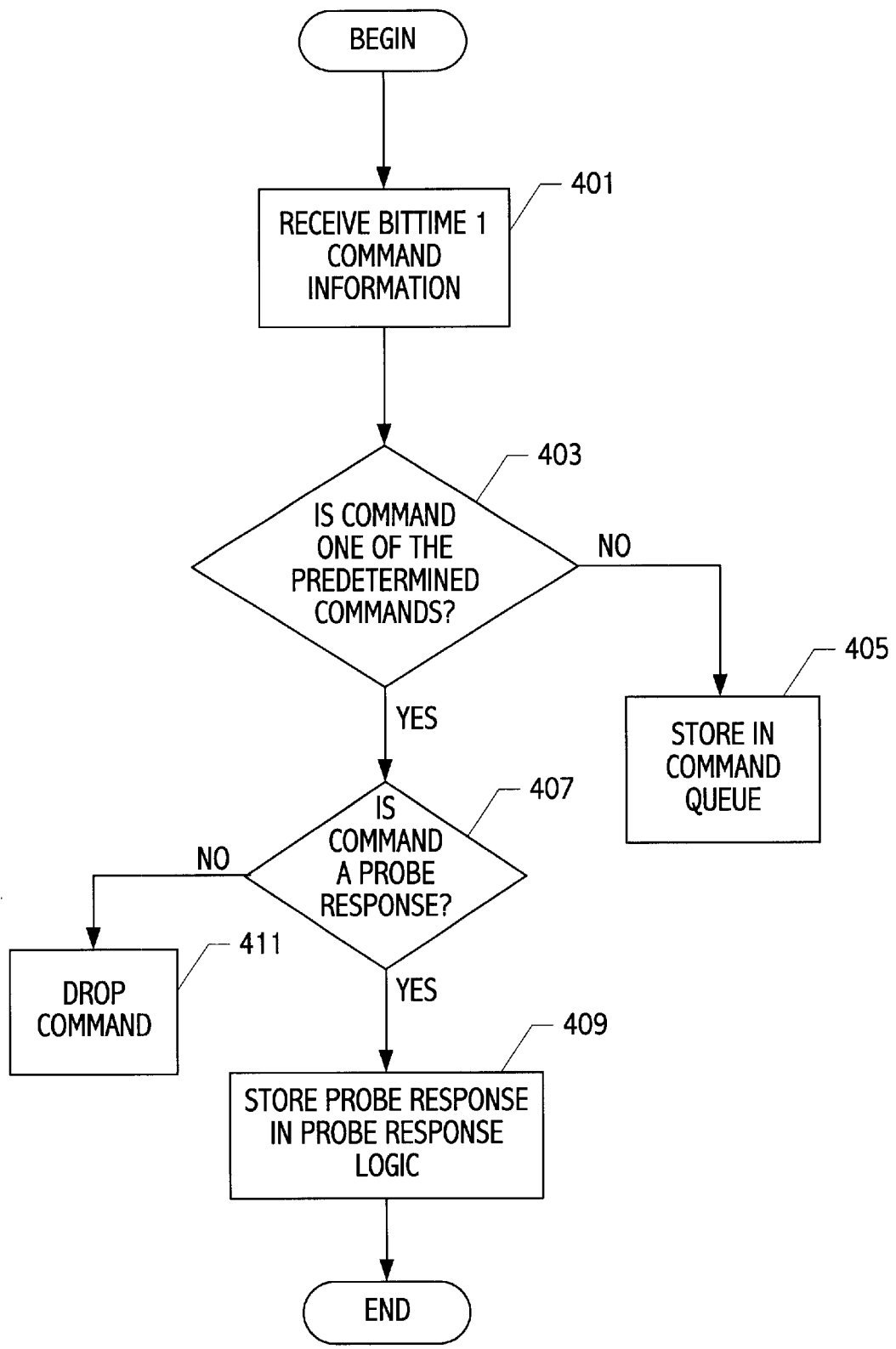
FIG. 4 is a flow chart illustrating operation of filtering commands received in the receive circuit.

Referring to FIG. 4, the flow diagram illustrates the operational flow of the receive circuit, command filter, command queues and related logic. In 401, a first portion of the 52 bit command information, received in bit time 1, is received into buffer 203. Filter circuit 220 receives the contents of buffer 203, which is selected by muxselect counter 207. In 403, filter circuit 220 determines if the command field in the first portion of the command channel information matches one of the predetermined commands. If not, then the command information is stored in command queue 212 in 405. If the command is one of the predetermined commands, then the receive filter determines in 407 whether or not the command is a probe response. If so, the probe response is stored in the probe response logic 222 in 409. Otherwise, the commands are dropped in 411. That means that all command segments associated with the command segment checked in filter 220 are dropped and not stored in command queue 212. The receive filter then continues receiving additional command information. Additionally, although not specifically illustrated in FIG. 4, encoded probe response information present in non-probe response commands is extracted by the command filter and is also forwarded to probe response logic 222 for out-of-order processing.

While the above description assumed the first portion of the 52 bit command information included the relevant command information to compare, one of skill in the art will appreciate that the relevant command information may be received in any phase. In fact, while filter 220 has been described as performing a filter operation based on a particular command, in fact the filter may check for any bit pattern, e.g., an address pattern, and filter out received command channel information appropriately.

Referring again to FIG. 2, in order to avoid deadlock situations, as previously described, probe responses should be processed out-of-order with respect to other commands in command queue 212. The probe response is forwarded to probe response logic 222. Depending on the nature of the probe response, information may be provided to command interpreter through signal lines 221 to indicate to the command interpreter that a data movement command or other command, as described further herein, needs to be sent to the processor. Signal lines 221 may convey a victim data buffer (VDB) buffer location in the processor as described further herein. In other cases, the probe response information may require no action on the part of the command interpreter. For example, the probe response information indicate a probe miss and that information may be conveyed to allow, e.g., a DMA operation to complete.

The probe response logic may be sufficient to hold multiple probe responses or in a simple implementation, only a single probe response. The probe response logic processes the probe responses both from the probe response commands and extracted from other commands, out-of-order with respect to command queue 212 to avoid possible deadlock situations.

If there is a memory modifying command affecting the cache line that is the subject of the probe command, that request should also be handled immediately, as described further herein, to maintain coherence. Exemplary memory modifying commands that might affect the cache line in question include write block, write sub-block and cache line evictions. All such commands should be handled appropriately to maintain coherency.

In one embodiment, the existence of a memory modifying command can be determined as follows. When a probe is issued to certain processors, the bus protocol allows the processor to indicate in its probe response that it has a command in-flight that will modify the cache line that is the subject of the probe. In other words, it indicates that the command has been issued by the processor and not yet executed and acknowledged by the north bridge. In one embodiment, the probe response includes a bit in the probe packet (e.g., a victim sent (VS) bit) to indicate the existence of a memory modifying command (see FIG. 3B) in-flight that is the subject of the probe. The packet also contains the buffer entry number in a victim data buffer (VDB[2:0]) field identifying the location of the data in the victim data buffer. The victim data buffer is a buffer on the processor storing evicted cache line or probe response data.

Based on that information, the north bridge constructs a generic data movement command to the processor using the buffer ID indicated in VDB[2:0] that instructs the processor to move the data in the victim data buffer to memory immediately, since it affects a cache line that is the subject of a probe. That data is then transferred from the processor over data channel 109 (see FIG. 1) to update system memory. That transfer takes place without a further request over command channel 107.

The memory modifying command for the same data movement to update system memory is still somewhere in command queue 212 and since the command queue is implemented as an in-order queue, e.g., a FIFO, the command in question can not be accessed and invalidated.

Accordingly, the VDB[2:0] value is saved into a memory modification command identification storage such as a "Victim Sent ID" queue. On removal from the command queue each command is compared to an entry in the memory modification command identification storage to determine if the command is a memory modifying command that should be discarded because its data movement has already been performed.

In one embodiment, the Victim Sent ID queue has eight entries (implemented e.g., as an eight bit register) to ensure multiple memory modifying commands can be canceled. The VDB[2:0] value is used as an index into the queue. The entry in the Victim Sent ID queue corresponding to the VDB[2:0] is flagged as having already been executed, e.g., by setting a bit. When the actual command that modifies the cache line is removed in-order from command queue 212, the command is discarded because it has already been executed as part of the probe response. The fact that is has already been executed is determined using the ID[2:0] field for the command at the top of command queue 212. That field, for the memory modifying commands is the same as the VDB[2:0] field, and thus indexes into the same location in the Victim Sent ID queue. That location in the queue is examined to see if the command should be discarded or further processed.

Using the generic data movement command to tell the processor to transfer the data identified by VDB[2:0] to memory in response to a victim sent bit being set, is akin to allowing the processor to generate a writeback cycle, as often happens as a consequence of a probe, e.g., when the probe response indicates that the cache line is dirty, i.e., its contents have been modified and not yet copied into main memory. While the memory modifying command did not start out as part of any probe response, the memory modifying command is incorporated into the writeback by handling the memory modifying command out of order. The difference is the need to cancel the command out of the command queue when it appears at the top, whereas a normal probe response with data movement does not require such action.

Referring again to FIG. 3B, in addition to the VS bit, the probe response may include an MS bit in the probe packet indicating that the processor previously sent a CleanToDirty or SharedToDirty command for the cache line that is the subject of the probe. Such messaging is an optimization that allows the processor to modify cache lines in a more efficient manner. The packet also contains the buffer entry number of a miss address buffer (MAB[2:0]) field identifying the addresses in question. The miss address buffer is a processor buffer storing addresses of read requests and cache state change broadcast requests.

If MS bit is set, northbridge immediately constructs and responds to the processor with a ChangeToDirtyFail command indicating the processor is not allowed to modify the status of the line. The MAB ID returned by the processor in the probe response is used as the ID. The north bridge stores MAB buffer ID in Probe Response in a "MAB Hit" register. That register works in the exact same manner as the "Victim Sent ID" register. Just like the "Victim Sent ID" register, the "MAD Hit" register has eight entries (e.g., 8 bits wide) to account for all possible MAB ID values. If the ID of the command at the top of command queue 212 matches a valid entry in the "MAB Hit" register, the command is discarded as the command has already been processed by indicating to the process that the request to change processor status failed. Unlike the case when the VS bit is set, no data movement occurs.

When there are no outstanding probe responses to process, command interpreter 224 pops commands off of command queue 212 for in-order processing. The approach described herein of executing most commands in-order maintains system coherency using a simple in-order implementation for the command queue while still prioritizing probe traffic ahead of normal traffic to avoid system deadlocks. Thus, in an environment where probe traffic should be handled expeditiously, the probe traffic can be handled ahead of the normal commands. That can be particularly useful in a multi-processing environment where probe traffic can be heavy. The partially in-order system described herein can be implemented with a reduced number of arrays and gates in comparison to a system implementing a fully out-of-order scheme.

The description of the invention set forth herein is illustrative, and is not intended to limit the scope of the invention as set forth in the following claims. For instance, while the invention has been described in an embodiment in which the receive circuit is located on a north bridge, one of skill in the art will appreciate that the teachings herein can be utilized any place it is desirable to filter received commands and process some commands in-order and some commands out-of-order, for example, on an integrated circuit incorporating both a memory controller and a processor. Variations and modifications of the embodiments disclosed herein, may be made based on the description set forth herein, without departing from the scope and spirit of the invention as set forth in the following claims.

What is claimed is:

1. A method comprising:
   receiving commands into an integrated circuit;
   determining when a received one of the commands is a probe response command;
   storing others of the received commands into a command queue;
   removing the others of the received commands from the command queue for processing, in a first in first out (FIFO) order from the command queue; and
   processing the probe response command ahead of commands stored in the command queue.

2. The method as recited in claim 1, further comprising storing the probe response in a location other than the command queue.

3. The method as recited in claim 1 wherein the determining is accomplished in a command filter circuit, filtering out a plurality of commands prior to selectively storing commands in the command queue, one of the plurality of commands being filtered being the probe response.

4. The method as recited in claim 3 wherein the command filter circuit extracts probe response information in commands to be stored in the command queue, the probe response information being provided for out-of-order processing.

5. The method as recited in claim 4 wherein the probe response information is one of a probe miss and a probe hit not requiring data movement.

6. The method as recited in claim 1 further comprising:
   receiving an indication in the probe response command that a cache line corresponding the probe response command is being modified by an outstanding data movement command in the command queue;
   issuing another data movement command for moving data modifying the cache line into system memory; and
   discarding the outstanding command when it is removed in-order from the command queue.

7. The method as recited in claim 6 further comprising:

storing an indication that the outstanding command should be discarded; and comparing commands as they are removed in-order from the command queue to determine if the command should be discarded.

8. The method as recited in claim 7 wherein the indications are stored in a victim sent identification queue, identifying the memory modifying commands, each entry in the victim sent identification queue corresponding to a different memory modifying command.

9. The method as recited in claim 8 wherein the a command identification field for commands being removed in-order from the command queue is used as an index into the victim sent identification queue to determine if an entry corresponding to the command identification indicates the command should be discarded.

10. The method as recited in claim 1 wherein the commands stored in the command queue include memory requests and input/output (I/O) requests.

11. The method as recited in claim 10 wherein the command queue comprises first and second command queue FIFO buffers and wherein the I/O requests are stored in the first command queue FIFO buffer and the memory requests are stored in the second command queue FIFO buffer.

12. The method as recited in claim 1 wherein probe responses and memory modifying commands affecting a cache line corresponding to the probe response are handled out-of-order, the memory modifying commands being handled out of order by issuing commands to effect their memory modifications.

13. The method as recited in claim 12 wherein all commands in the command queue are removed from the command queue in-order.

14. An integrated circuit, comprising:

a plurality of receive elements coupled to receive processor requests, including command information; and a command filter circuit, coupled to the receive elements and responsive to the command information to selectively forward the received requests;

a command queue coupled to the command filter circuit to store the forwarded received requests, the command queue being unloaded for processing in a command interpreter generally in a first in first out (FIFO) order; and wherein the command filter is responsive to a received probe response command to forward the probe response command for processing ahead of requests previously stored in the command queue.

15. The integrated circuit as recited in claim 14 wherein the probe response is stored in a probe response queue.

16. The integrated circuit as recited in claim 14 wherein the command information is received from a processor.

17. The integrated circuit as recited in claim 16 wherein the processor is located on the integrated circuit.

18. The integrated circuit as recited in claim 14 further comprising memory modifying command identification storage to store an indication received from the probe response command that a cache line corresponding the probe response command is being modified by an outstanding command in the command queue.

19. The integrated circuit as recited in claim 18, further comprising a compare circuit coupled to compare commands removed in-order from the command queue to the indication stored in the memory modifying command identification storage and supply a compare indication thereof.

20. The integrated circuit as recited in claim 18 wherein the outstanding command is discarded on removing the outstanding command in-order from the command queue according to the compare indication.

21. The integrated circuit as recited in claim 14 wherein the command queue comprises first and second command queue FIFO buffers and wherein I/O requests are stored in the first command queue FIFO buffer and memory requests are stored in the second command queue FIFO buffer.

22. The integrated circuit as recited in claim 14 wherein the command filter is responsive to received probe information in a command other than a probe response command to extract the receive probe information and supply the extracted receive probe information for processing out-of-order.

23. An integrated circuit comprising:

means for detecting a probe response and selectively forwarding other commands received;

a first in first out command queue for storing the selectively forwarded commands for in-order processing; and means for processing probe response information out-of-order.

24. The integrated circuit as recited in claim 23 further comprising means for executing, out-of-order, data movements specified by memory modifying commands in the command queue affecting a cache line corresponding the probe response containing the probe response information.

* * * * *